Oct. 9, 1962
D. JAQUITH
3,057,243
MOUTHPIECE FOR A WIND INSTRUMENT
Filed April 27, 1959
2 Sheets-Sheet 1
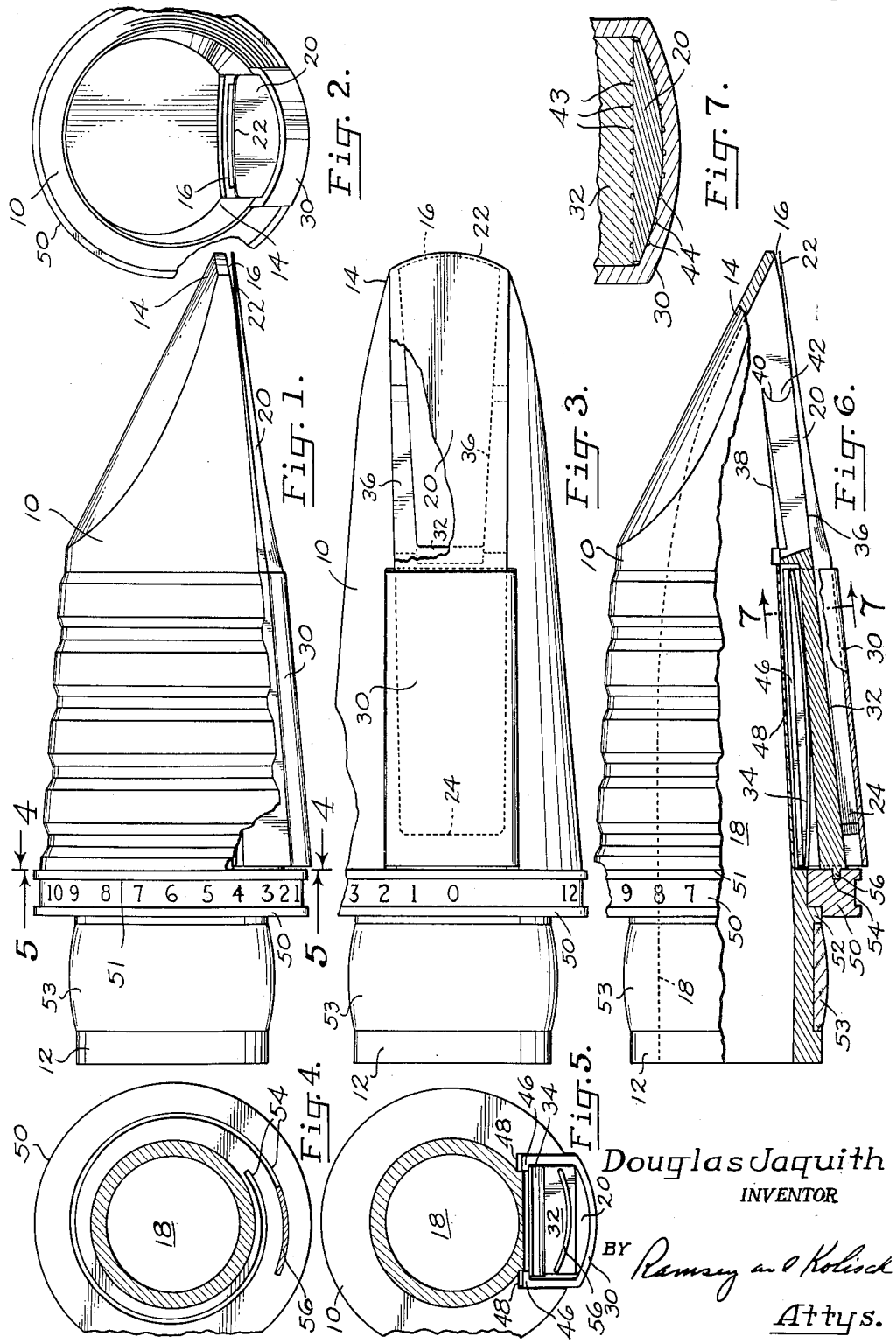
Douglas Jaquith
INVENTOR
BY Ramsey and Kolisch
Attys.

Oct. 9, 1962  D. JAQUITH  3,057,243
MOUTHPIECE FOR A WIND INSTRUMENT
Filed April 27, 1959  2 Sheets-Sheet 2
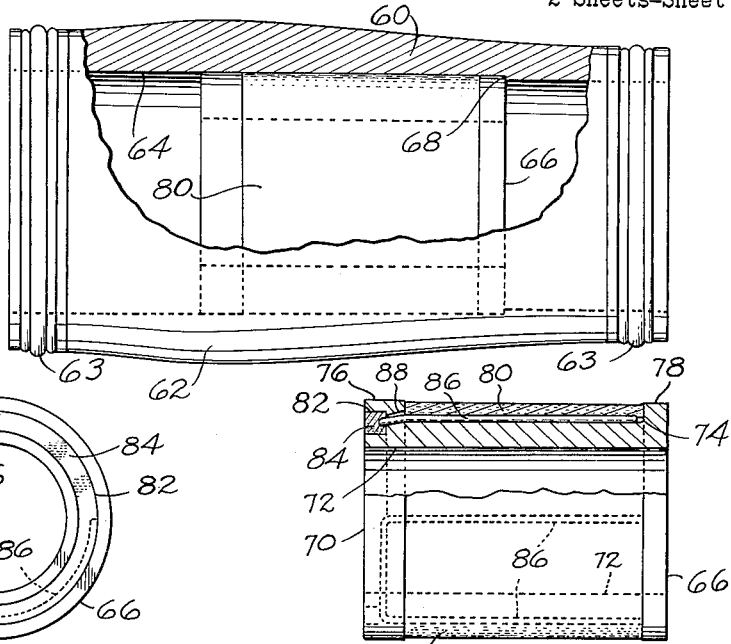
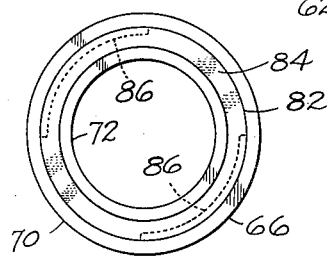
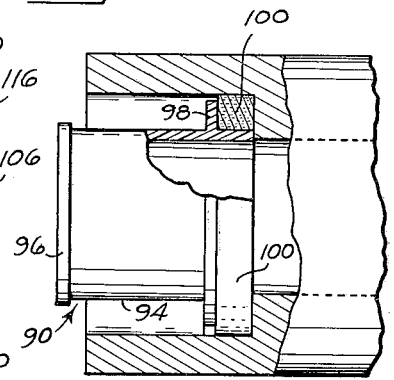
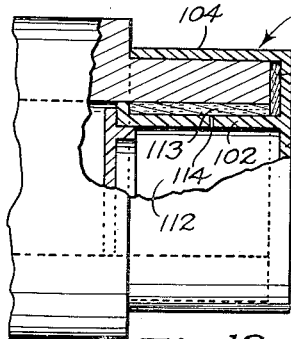
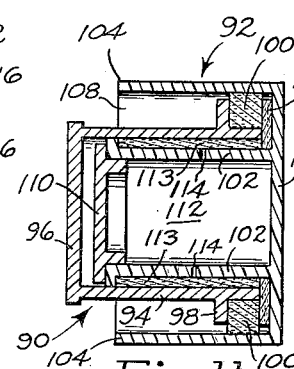
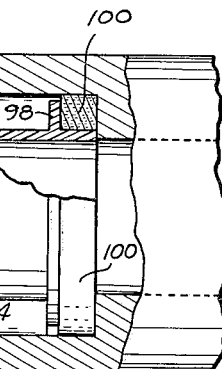
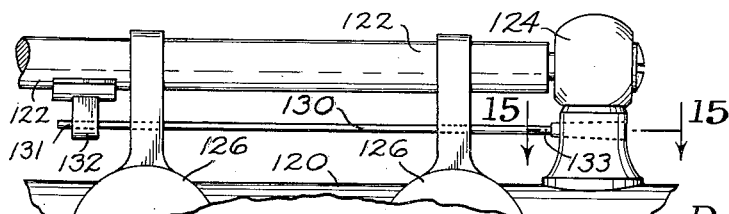
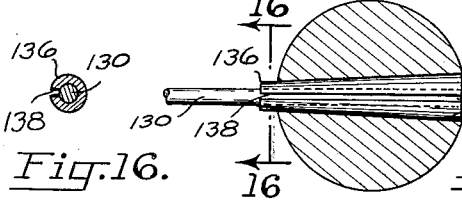
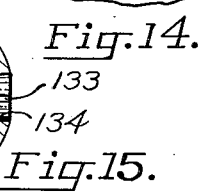
Douglas Jaquith
INVENTOR
BY Ramsey and Kolisch
Attys.

United States Patent Office 3,057,243
Patented Oct. 9, 1962

3,057,243
MOUTHPIECE FOR A WIND INSTRUMENT
Douglas Jaquith, 846 Cascade Drive, Salem, Oreg.
Filed Apr. 27, 1959, Ser. No. 809,171
5 Claims. (Cl. 84—383)

This invention relates to wood-wind instruments, and more particularly to wood-wind instruments of the reed type such as the saxophone and clarinet.

It is a general object of this invention to provide an improved construction for the mouthpiece of such an instrument, improvements in the mortice and tenon ends which connect the joints of the instrument together, and improvements in the biasing of the keys of the instrument.

Conventionally the mouthpiece of an instrument comprises an elongated, hollowed-out part with a lip at one end. At the lip end there is provided a wind opening which communicates with the hollow interior. A reed is secured over this opening, using a ligature or similar means. Reeds vary, and the type of sound produced by the reed is dependent upon the distance of its tapered end from the wind opening of the mouthpiece, this distance being sometimes referred to as the "lay" of the reed. A musician sands or otherwise shapes a reed so as to prepare it to his liking.

This invention contemplates a novel mounting for a reed which accommodates adjustment in small increments of the position of the tapered end of the reed relative to the wind opening of the mouthpiece. The construction is easily adjusted to permit the complete removal of a reed. Once mounted, a reed is readily adjusted to any desired position, and thus the invention eliminates the need of tedious fashioning of the reed before mounting. Thus a more specific object of the invention is the provision of a novel mounting for a reed which accommodates adjustment in the reed's position relative to the wind opening of the mouthpiece and easy removal and substitution of a reed.

Another object of the invention is the provision of novel means for gripping a reed whereby it is held securely from twisting. A reed-supporting member lies along the side of the mouthpiece which has the wind opening formed therein. This is pivoted to the mouthpiece body, and has a ribbed surface which operates to bite into the underside of a reed disposed thereagainst thus to hold it. A clasp member fits over the outside of a reed, this clasp member having a ribbed surface similar to the surface of the supporting member. The clasp member and reed-supporting member are maintained in gripping relationship on the butt end of a reed by an elongated leaf spring interposed between the two.

A clarinet ordinarily is made of wood, and comprises plural joints which are connected together by mortice and tenon ends. Specifically, the usual clarinet comprises a mouthpiece which has a tenon end insertable into the mortice end of a barrel joint. This barrel joint in turn has a mortice end which fits about the tenon end of the upper joint of a clarinet. A lower joint is connected to the upper joint, and a bell at the end of the clarinet is connected to the lower joint in a similar manner, by mortice and tenon ends. These wood joints are treated to prevent cracking and other harm that results from moistening of the parts. However, complete care of the instrument requires that the joint ends be lubricated, as moisture passing downwardly from the mouthpiece of the instrument otherwise tends to be absorbed into the end grain at the ends of the instrument joints. An object of this invention is the provision of a novel construction for the mortice and tenon ends which makes possible continuous lubrication of the end grain of the joints at all times that an instrument is assembled and in playing condition.

Moisture is particularly troublesome between the barrel joint and thte upper joint of a clarinet. In an embodiment of the invention, it is contemplated that the barrel for the clarinet be comprised of a substantially cylindrical body having an axial bore extending therethrough, and inserted within this bore a removable annulus or cylinder. One end of the annulus together with the wall of the bore defines a mortice for receiving the tenon end of the clarinet upper joint. This one end is provided with a ring of lubricant dispensing material that constantly is in contact with the end edge of the tenon end, when the clarinet is assembled. The annulus also is provided with reservoir means for holding a supply of lubricant, and means for feeding the ring of dispensing material continuously from this reservoir.

This invention also has as one of its objects the provision of novel end covers for the mortice and tenon ends for lubricating the ends when the clarinet is broken down. The usual clarinet case requires that a clarinet be broken down before it is stored. When broken down, the ends of the instrument joints are exposed. The end covers of this invention comprise a pair of mating shell portions that may be slipped together between periods of use with one fitting within the other. When a clarinet is broken apart, the two shell portions may be separated and one of them fitted snugly over the tenon end of a joint. The other shell portion fits within the mortice of another joint. The two shell portions are provided with rings of a lubricant dispensing material, so that when the shell portions are placed in position the mortice and tenon ends are lubricated. The rings of lubricant dispensing material are resupplied with lubricant from a reservoir provided in one of the shell portions when the shell portions are fitted together.

Another feature and object of the invention is the provision of a novel mounting for the return spring usually found in a wood-wind instrument for returning a key to its normal rest position. It has been the practice in the past to mount a needle spring on the usual key post which mounts a key with one end secured to the key post and with the other end projecting from the key post and producing bias on the key. The one end of the spring is secured in place by annealing the end, which process has the effect of taking out the temper of the spring end so that it becomes brittle. As a result, the spring has tended to break away from the key post making repair necessary. By this invention, the spring is mounted using an elongated, tapered collet that is split along its length. This collet is placed about the spring and wedged within a tapered bore formed in the key post. When the collet and needle spring are positioned in the tapered bore, the wall of the bore forces the sides of the collet together about the spring end. A firm connection results, which is relatively trouble-free.

The invention is discussed in the following description that is to be read in conjunction with the accompanying drawings, wherein:

FIG. 1 is a side view of a mouthpiece for a wood-wind instrument, said mouthpiece being constructed according to an embodiment of this invention;

FIG. 2 is a view of an end of the mouthpiece in FIG. 1;

FIG. 3 is a bottom view of the mouthpiece, showing the reed supported along the bottom side thereof;

FIG. 4 is a section view along the view 4—4 in FIG. 1, showing the end of a rotatable adjusting collar present in the construction;

FIG. 5 is a section view viewing along the line 5—5 in FIG. 1;

FIG. 6 is a view similar to FIG. 1, but with portions broken away to illustrate details of the construction;

FIG. 7 is a section view along the line 7—7 in FIG. 6;

FIG. 8 is a side view with portions broken away of a clarinet barrel joint;

FIG. 9 is a view of a removable annulus or cylinder which is mounted within the barrel joint according to an embodiment of the invention;

FIG. 10 is an end view of the annulus illustrated in FIG. 9;

FIG. 11 is a section view of a pair of mating shell portions that are adapted to be separated and when separated are used to cover the mortice and tenon ends of clarinet joints;

FIG. 12 illustrates the mortice end of a clarinet joint with one of the shell portions inserted therein;

FIG. 13 illustrates the tenon end of a clarinet joint with the other of the shell portions inserted thereover;

FIG. 14 is an enlarged view of portions of the side of a clarinet, showing a key rod and a mounting for the spring returning the key rod to its rest position;

FIG. 15 is a section view, slightly enlarged, along the line 15 in FIG. 14 and showing details of the mounting for the needle spring; and FIG. 16 is a section view along the line 16—16 of FIG. 15.

Referring now to the drawings, and more particularly to FIGS. 1 through 7 wherein details of a mouthpiece construction are illustrated, the mouthpiece of the invention comprises a body portion 10 having at one end a tenon 12 adapted to be inserted into the mortice end of a barrel joint for a clarinet, and at its other end a lip or tip 14 which is placed during playing in a musician's mouth. The tip or lip end tapers off from the top of the mouthpiece. At the base of the mouthpiece there is provided the usual wind opening 16, and this communicates with a chamber 18 within the interior of the mouthpiece body.

Secured to the underside of mouthpiece body 10 is the usual reed 20. This has a tapered end 22 which is positioned over the wind opening 16. Various reeds conventionally will differ one from another, and the character of the sound produced by the instrument is related to the position of the tapered end of the reed relative to the wind opening and the lip of the mouthpiece.

A butt end 24 of reed 20 is secured to the mouthpiece body 10 by means of a clasp portion 30, an elongated reed-supporting member 32 and a leaf spring 34, the latter being interposed between the reed-supporting member and the clasp portion and operable to urge the two together so as to grip firmly onto the butt end of the reed. Specifically, reed-supporting member 32 is bifurcated at one end, and is mounted with the legs 36 of the bifurcated end straddling the wind opening 16. The body portion 10 of the mouthpiece has formed therein elongated channels 38 which receive the legs 36 and support them while preventing side shifting of the reed-supporting member 32. The legs themselves partially define the edges of the wind opening as can be seen in FIG. 3. The forward ends of the legs are concavely curved at 40, and these curved portions rock on rounded shoulders 42 integral with the mouthpiece body. The curved portions and shoulders provide pivot connections for the end of the reed-supporting member adjacent the lip end of the body.

The rear end of the reed-supporting member is expansive, and during operation firmly contacts the underside of a reed. Elongated grooves having elongated, laterally defining shoulders 43 are formed in the bottom surface of the reed-supporting member, and these shoulders 43 function to grip onto the reed and prevent it from twisting when a reed is secured in place.

Clasp member 30 which overlies the reed and the reed-supporting member is elongated and channel-shaped in cross section, as best shown in FIGS. 3 and 5. The inner surface of the clasp contains elongated grooves having laterally defining shoulders 44, and these shoulders perform a function similar to shoulders 43 in holding the butt end of the reed from lateral shifting.

The clasp has side flanges which extend upwardly and terminate along their top edges in turned-in lips 46. The side flanges and turned-in lips are received within a hollowed-out portion formed along the base of the mouthpiece body 10. The base 48 of the hollowed-out portion (see FIG. 5) limits pivotal movement of the clasp member with the reed-supporting member upwardly relative to body 10 beyond a predetermined position. During adjustment of the position of reed 20, the lips 46 of the clasp are positioned slightly below base 48, and this enables the clasp member and reed-supporting member to move as one.

Leaf spring 34 as can be seen in FIG. 6 has a concave side that faces upwardly. The spring is mounted adjacent the upper side of the reed-supporting member, with its ends seating on turned-in lips 46 of the clasp member. An intermediate portion of the spring bears against the reed-supporting member, and urges the same downwardly relative to the clasp member against the butt end of a reed. Thus the spring is operable to produce clamping of the reed between the clasp and reed-supporting member.

Adjacent the nonpivoted end of the reed-supporting member and encircling the mouthpiece body is a rotatable adjusting collar indicated at 50. This is held in place against a shoulder 51 of body 10 by an annular flange 52 that bounds one side of a ring of cork 53. Helical groove and cam means interposed between collar 50 and the nonpivoted end of the reed-supporting member enables pivotal adjustment of the reed-supporting member and thus adjustment in the position of the tapered end of the reed on turning of collar 50. Specifically, indented into the end of the collar member 50 is an elongated, helical groove indicated at 54 (see FIG. 4). The groove receives a guide finger 56 that projects from the end of the reed-supporting member and is integral therewith. The guide finger follows the groove as the groove is turned relative to body 10.

Considering now the operation of the mouthpiece, FIGS. 4, 5 and 6 illustrate the parts in the position they occupy when the collar is turned in a counterclockwise direction in FIG. 4 to its greatest extent. In this position, the tapered end of the reed is at its closest to the lip of the body portion. When the collar is then turned in a clockwise direction as viewed in FIG. 4, groove 54 produces inward movement of the reed-supporting member, and initially the reed-supporting member, clasp, leaf spring, and reed move as a unit. Inward movement of the butt end of the reed is accompanied by outward movement of the other end of the reed, and it is in this manner that the lay of the reed is adjusted.

On continued turning of collar 50, the turned-in lips 46 of the clasp come in contact with base 48. When the collar is then further rotated, the left end of the reed-supporting member pivots inwardly while the clasp member is held stationary. This produces compression of the leaf spring, and movement of the supporting member away from the base of the clasp and the butt end of the reed. It is at this time that loosening of the butt end of the reed occurs permitting the withdrawal of a reed. After a reed has been replaced, the adjusting collar may be rotated in the opposite direction, to enable spring 34 effective to move the clasp relative to the supporting member and the production of clamping pressure on the butt end of a reed.

As discussed briefly above, moisture is a problem with wood-wind instruments. When moisture is absorbed by the wooden parts of the instrument, cracking and splitting occurs. As a precaution against such damage, this invention contemplates the provision of novel means whereby the mortice and tenon ends that connect the joints of an instrument may be constantly lubricated during those times that an instrument is assembled for playing. This invention also contemplates means for lubricating the joints when the instrument is broken down.

Referring more specifically to FIGS. 8, 9 and 10, 60 indicates the barrel joint of a clarinet. The barrel joint comprises a substantially cylindrical body portion 62 that is slightly bulbous at its left end, the latter end being adapted to be connected to the upper joint of a clarinet. The other end of the barrel joint connects with the clarinet mouthpiece. Metal bands 63 extend around the barrel joint at the two ends to strengthen the joint.

Extending through the longitudinal center of body portion 62 is an elongated, slightly tapered bore 64. The enlarged end of the bore is toward the bulbous end, or that end which connects with the upper joint.

Fitted within bore 64 and removable therefrom is an elongated annulus or cylinder 66. This cylinder seats against a shoulder 68 formed in bore 44 (the taper of the bore between the left end and shoulder 68 being slightly less than the taper of the bore progressing thereon). Annulus or cylinder 66 is illustrated apart from body 62 in FIG. 9, and it will be seen that it comprises a body portion 70 having a bore 72 extending axially through its center. Formed in the periphery of the annulus is a wide and relatively shallow channel 74 defined along its sides by ribs 76, 78. These ribs have tapered outer edges, and the annulus fits snugly within the body portion of the barrel joint when mounted in place as shown in FIG. 8.

Mounted in the wide and relatively shallow channel is a band of absorbent material, such as felt and the like, indicated at 80. This band functions as a reservoir for lubricant. An annular groove 82 is indented into the left end of the annulus and fitted within the annular groove is a ring of lubricant dispensing material 84, which also may be of felt. Lubricant is fed to the ring from the band of material 80 by wicks 86 which extend longitudinally along the annulus and on the inside of band 80, thence through small bores 88, and finally into groove 82 where they contact ring 84.

When the annulus is mounted within body portion 62, the right end of the annulus together with the wall of bore 64 defines a mortice which connects with the tenon at the end of the usual mouthpiece. The left end of the annulus together with the wall of bore 64 defines a mortice which fits about the tenon at the upper end of the upper joint of the usual clarinet. When the upper joint and barrel joint are connected together, the construction described is effective to transmit lubricant continuously from the ring of material 84 and band 80 to the edge of the tenon end of the upper clarinet joint. This has the effect of inhibiting the absorption of moisture by the upper clarinet joint and reduces chances of splitting and cracking of the joint. It is an easy matter to resupply the annulus with lubricant after the annulus is removed from the barrel joint.

Now referring to FIGS. 11, 12 and 13, during storage when the clarinet is broken down, the mortice and tenon ends may be continuously lubricated by the mating shell portions indicated at 90 and 92. Considering these mating shell portions, shell portion 90 comprises a cylindrical wall 94 which is closed off at one end by a radial wall 96. At the other end of cylindrical wall 94 there is provided a radially outwardly projecting annular flange 98. Secured to the outer face of this flange is a ring of lubricant dispensing material (such as felt) indicated at 100.

Shell portion 92 comprises a pair of concentrically arranged cylindrical walls 102, 104 which are joined together at one set of ends by radial wall 106. The cylindrical walls and radial wall 106 define an enlarged annular cavity, indicated at 108. This cavity is shaped to receive the cylindrical wall 94 and flange 98 of shell portion 90 when the parts are assembled together as in FIG. 11. The center cylindrical wall 102 of the shell portion 92 is closed off at the end away from wall 106 by a cap 110. Thus a cylindrical cavity 112 is formed, and this cavity functions as a reservoir for lubricant. Lubricant flows from this reservoir through small bores 114 to a felt overlay 113 provided around wall 102 and thence passes to a lining 116 provided at the base of annular space or cavity 108. With the parts assembled as in FIG. 11, this lining is fed oil constantly from the reservoir, and acts to saturate the ring of dispensing material 100 which is pressed thereagainst.

When the shell portions are separated and used to moisten with oil the mortice and tenon ends of clarinet joints, the first shell portion 90 is fitted within the mortice of a joint as shown in FIG. 12. The ring of material 100 then contacts the base wall of the mortice, and lubricates the wood wall end grain at the base. The other of the shell portions is inserted over a tenon end as shown in FIG. 13. In this position, the lining 116 at the base of the annular cavity 108 contacts the end of the tenon, and provides end grain lubricant at this end. The shells when mounted in position on the joints of a clarinet do not add appreciably to the overall length of the parts, and thus they may conveniently be used when the joints are packed in the usual carrying case provided for clarinet instruments.

Considering now the construction of the spring return for the key rod and keys of an instrument, and referring now more particularly to FIGS. 14, 15 and 16, the body of a clarinet is indicated at 120. As is conventional in a clarinet, extending more or less parallel to the body of the clarinet and spaced outwardly a small distance therefrom is a key-actuating rod 122. This rod has ends rotatably mounted in key posts such as post 124. Integral with the rod may be keys 126 used in playing a clarinet.

The spring return for the key rod and keys that returns these parts to their normal rest position between periods of actuation comprises a needle spring 130 having an end 131 bearing against an abutment 132 integral with rod 122. The needle spring in the embodiment shown in the drawings is operable to urge the abutment in a direction extending out of the plane of the paper. The other end 133 of the needle spring is mounted in fixed position on key post 124.

With respect to the mounting of this other end 133, extending through the needle post is a tapered bore 134. This has its smaller end disposed toward end 131 of spring 130. The enlarged end of bore 134 is disposed away from end 132. Fitted within bore 134 is a tapered collet 136. The latter part is split along its length at 138. The collet is tapered in the same direction as the taper of bore 134. The collet surrounds end 133 of the needle spring, and is operable to grab this end by radial compression.

In mounting the spring, the collet is placed around the spring end and the two parts driven into the tapered bore until the compression exerted on spring end 133 by the collet is effective firmly to grip the spring end. The construction makes unnecessary annealing of the spring end, as was formerly done, such process being disadvantageous as it produces imbrittlement of the spring end so as to cause early failure at this point. The connection afforded by the collet is firm enough to hold the spring end securely during extended use of the clarinet, without the spring falling out and with the spring performing its necessary biasing of the key rod and keys.

It will be seen from the above that this invention contemplates a number of novel features which contribute to the ease of handling a wind instrument. The mouthpiece construction readily facilitates adjustment in the position of the reed carried against the wind opening of the mouthpiece, and removal of this reed and the substitution of a new one therefor. The lubricating construction described enables continuous lubricating of the tenon and mortice connections of the joints of a clarinet, this lubrication taking place both when the clarinet is assembled for playing and when it is broken down for storage. The mounting for the spring return for the key post and keys makes possible a fast connection without imbrittlement of the spring.

It is claimed and desired to secure by Letters Patent:

1. A mouthpiece for a reed, wood-wind instrument comprising a mouthpiece body having an internal chamber, a lip end and a wind opening at the lip end and in one side of the body communicating with said internal chamber, an elongated reed-supporting member with one end toward the lip end and the other end disposed away from said lip end mounted along the side of said body containing said wind opening, said reed-supporting member having a support surface adapted to bear against and support the underside of a reed, elongated shoulders formed in said support surface extending longitudinally of said reed-supporting member, a clasp member mounted over said reed-supporting member and having an inner surface adapted to bear against the other side of a reed supported thereon, said clasp member having shoulders extending along said inner surface substantially parallel with said first mentioned shoulders, bias means for urging said clasp member toward said supporting member and against a reed mounted therebetween, and means for adjusting the angular position of the clasp member and reed-supporting member as a unit relative to said mouthpiece body so as to adjust the angular position of a reed held therebetween relative to the mouthpiece body.

2. A mouthpiece construction for a reed, wood-wind instrument comprising a mouthpiece body having a lip end and containing a wind opening in one side of the body at the lip end of the body, an elongated reed-supporting member disposed along the side of said body containing said wind opening and having one end adjacent the lip end and its other end spaced therefrom, means pivotally mounting the reed-supporting member on said body for movement of said other end toward and away from said body, a clasp member mounted on said body over said reed-supporting member for holding with the reed-supporting member a reed in playing position, the mounting for said clasp member on said body accommodating limited movement between the two, bias means interposed between said clasp member and reed-supporting member for urging the two toward each other and into a position clamping onto a reed, and adjustment means for adjusting in small increments the position of said other end of said reed-supporting member relative to said body, said adjustment means moving said other end between a position wherein the clasp member and supporting member move as a unit and a position wherein movement of the clasp member is prevented and the reed-supporting member moves independently of said clasp member.

3. The adjustment means of claim 2 which comprises a rotatable member encircling said mouthpiece body adjacent said other end of said reed-supporting member, and helical groove and cam means interposed between said rotatable member and said reed-supporting member operable on rotation of the rotatable member to move said reed-supporting member relative to said body portion.

4. An improved mouthpiece for a reed, wood-wind instrument comprising a body portion having a lip at one end, an internal chamber and a wind opening in one side of the body at the lip end communicating with said internal chamber, an elongated reed-supporting member disposed along the side of said body containing said wind opening with one end adjacent the lip end of the body and its other end spaced therefrom, said other end being movable toward and away from said body, a clasp member mounted over said reed-supporting member, bias means interposed between the clasp and reed-supporting members for urging the two into clamping relationship about the end of a reed disposed therebetween, adjustment means for adjusting the position of said clasp and reed-supporting members inwardly toward said body, and stop means preventing inward movement of said clasp member after limited movement of the member.

5. A mouthpiece for a reed, wood-wind instrument comprising a mouthpiece body, an elongated reed-supporting member mounted along one side of said body for movement of an end thereof toward and away from said body, said reed-supporting member having an outer surface adapted to support one side of a reed, a clasp member mounted over said reed-supporting member and having an inner surface adapted to bear against the other side of a reed, and spring means interposed between said clasp member and said reed-supporting member operable in multiple positions of the reed-supporting member to urge the clasp member into clamping relation against a reed.

References Cited in the file of this patent

UNITED STATES PATENTS

| 1,748,077 | Packman et al. | Feb. 25, 1930 |
| 2,036,356 | Pedler | Apr. 7, 1936 |
| 2,181,880 | Fauss | Dec. 5, 1939 |
| 2,234,093 | Silver | Mar. 4, 1941 |
| 2,496,749 | Reddick | Feb. 7, 1950 |
| 2,525,523 | Chance | Oct. 10, 1950 |
| 2,530,155 | De Luca | Nov. 14, 1950 |
| 2,744,435 | Anderson et al. | May 8, 1956 |
| 2,833,175 | Le Blanc | May 6, 1958 |

FOREIGN PATENTS

| 994,767 | France | Nov. 22, 1951 |